No Printed Specification Available
9734X
C. Knisely,
Cording Bedsteads,
Patented June 16, 1836.
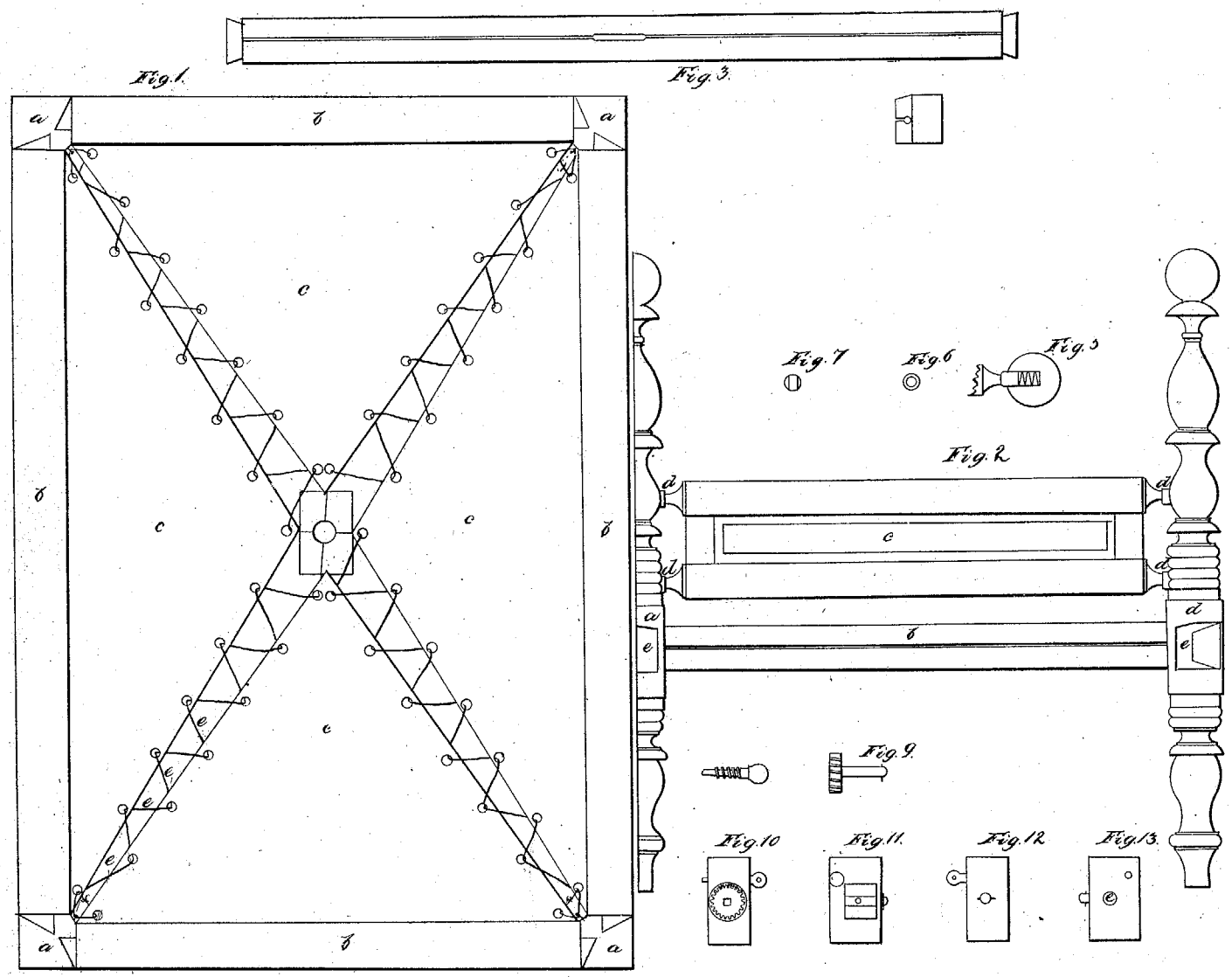
N. PETERS, PHOTO-LITHOGRAPHER, WASHINGTON, D. C.

X 9734

June 16. 1836

Christian Knisely of Meadville co. of Crawford
State of Pennsylvania
Letters Patent The schedule referred to in these Letters Patent, and making part of the same, containing a description in the words of the said Christian Knisely himself of his improvement in the manner of making and cording Bedsteads.

---

To all to whom these Presents shall come
Be it Known, that I Christian Knisely of Meadville in the county of Crawford and state of Pennsylvania, have invented a new and useful improvement in the manner of constructing Bedsteads, & that the following is a full and exact description of the construction and operation thereof.

Firstly. The rails and posts of the Bedstead are connected together by right angled triangular dove tail tenons, made in the following manner. First, strike round the rail by a square one and an half inches from the end, then draw a line parallel with the rail, three inches from the outside, which will leave a shoulder of one and a half inch upon the inside the rail being four and a half inches square, then establish a point on the line across the rail within one fourth of an inch of the outside, then draw a line from that point to intersect with the parallel line at the end of the rail, which forms the right angled triangular shape of the tenon, invert the rail and go through with the same process as before, and the tenon will be formed, with the exception of the dovetail, leaving also a shoulder on the outside one fourth of an inch; the dovetail is laid out after the tenon is worked off, turn the rail with the inside up, establish two points for the laying out of the dovetail on the inside of the tenon at the shoulder, half an inch from the bottom and top of the rail, then draw lines from these points, touching the corners of the tenon at the end of the rail which completes the draft or shape of the dovetail, it having a termination at the first established point, thence along the angle of the tenon to the

9734X extreme corner of the angle.

Secondly; A Description of the mortise, which is trapezoid in its form where the tenon enters the post - Strike two lines square across the post the size of the rail apart, then draw two parallel lines lengthwise with the post, one a fourth of an inch, the other three inches from the outside then establish two points on the second parallel line half an inch within these lines across the post, then draw lines from these points, touching the intersection of the other parallel and two cross lines, which will complete the trapezoid,  [illegible] the mortise in the shape that the tenon may fit, the the tenon will enter neatly by placing the extreme angle of the tenon, at the extreme angle of the mortise which will be at the first parallel line - The rails may be braced in, as shown on one end of the Model -

Thirdly - a description of the head and foot boards which are so arranged as to admit of being put in and taken out, without uncording the Bedstead, by bushing the posts where the boards enter, the bushes or ferrules are turned the diameter to be one and a half inch, by one and three fourths of an inch long, with a socket one inch diameter, by three fourths of an inch deep, at one end of the boards, these bushes are put in solid, with glue and the opposite end is arranged by means of a wire spiral spring attached to the end of the Bush at the bottom of the hole, so as to admit, the bush to be pressed in sufficiently to enter the tenons at the other end the tenons may be made square or round and operate on the same principle.

Fourthly - A description of the sacking, how made, in what manner attached to the rails, and how strained - The sacking is made in four triangular pieces, the length of one side of each of the side pieces being equal to the length of its corresponding side rail, the other two sides of each piece being cut so as to leave a space of five inches in the centre of the bedstead between the two points, the length of one side of each of the end pieces being equal to the length of its corresponding end rail, the other two sides of each piece being cut so as to leave a space of seven inches in the centre between these two points, which makes the space where the lacing cords come in, equal - There should be a small cord worked into the hem of the sacking all round, the hem on the side which is attached to the rail requires to be about three inches broad, with a cord in it sufficiently large to prevent its drawing out of the rail, each rail having a hole perforated from end to end inside of the tenons, half an inch diameter, which is bored, after-having sawed a groove along the centre of the rail upon the inside as low as the tenons, and having run an instrument through the saw carf to make an opening to guide the point of the augur the saw carf must be large enough to admit two thicknesses of the sacking into which the sacking is drawn, the cord in the hem passing along in the hole which prevents its drawing out; each piece, however should be cut long enough on the side that is attached to the rail, to admit the points to be clipped off so that the ends of the cord in the hem running from the centre of the bedstead touch the ends of the rails upon the inside, there should be an eyelet hole at each corner, the corners or points of the end pieces at the centre of the bedstead, should have two eyelets opposite, as near the point as may be, the intermediate space should be divided into a suitable number of eyelets and so arranged as to admit of the cord passing regularly from one to the other alternately; commencing at the centre of the bedstead, the Jack being stationed at the centre and the cord being in two pieces, and each piece drawn half its length through the arbor in the Jack; on arriving at the post, the cord is passed round a hook in the corner of the post and made fast, the corner of the post where the hook is screwed in, is taken off to the rails: The screw Jack is then applied, until the sacking is sufficiently strained, which completes it as shewn on draft No. 1.—

Draught No. 2. presents sacking of a different shape being cut into four oblong squares, leaving a space of four inches from the centre of the bedstead to the centre of each rail, the side rails are made in the same manner as described above, and found on Draught No. 1. with the exception of an opening made at the centre of the rail, say half an inch by four inches long and as deep as the groove, at which place the sacking is drawn in, and fastened by means of eyelets in the sacking, to the iron hooks in the end rails which are grooved out with a half round, and along it the hooks screwed in so as to come out
but little more than flush with the inside of the rail. This method of ar-
rangement will permit the sacking to be put in, and taken out without
separating the bedstead; it is laced in the same manner as the other; com-
mencing at the Centre.

Fifthly. A Description of the hooks with pullies on. The Hook may
be made of wire, one fourth of an inch in diameter, the end to receive the pully
turned up at a right angle, three fourths of an inch long, the pully being
a little less in thickness so as to admit of being rivetted slightly after being
put on, the diameter about three fourths of an inch, these hooks and pullies
are designed for Bedsteads without sacking, they are screwed in along
the centre of the rails upon the inside, the rails being grooved out, with
a half round as shewn on Draft No. 2 each rail should have an odd
number of hooks, the odd hook to be placed at the centre of the rail
so that the cords proceeding from the Jack (which is also stationed at
the centre) will run at right angles when corded and the ends made
fast at the corners, the Jack is applied until sufficiently strained.

Sixthly. A Description of the straining Jack and directions how to make
it. Take a block four by five inches and eight inches long, and number
the four sides as follows, 1, for instance is the top side five inches 2 is the
side for the wheel, four inches across 3 the underside, five inches wide
4 the opposite side to the wheel, four inches; strike round the centre of
the block by a square, establish two opposite points on the centre of the
block on sides No. 2 and 4 for the centre of the arbor, on side No. 2
bore a hole, three and a half inches diameter, one inch deep for the
tooth wheel, then reduce it to one and a fourth inch diameter for the
arbor on the wheel, and bore through the block, then draw a circle
across side No. 2, two and one sixteenth inch at the right hand of the
former circle for the centre of the spiral arbor, square or scribe across
sides No. 1 and 3. On these establish two opposite points, eleven six-
teenths of an inch from side No. 2. then bore a hole from side No. 3
One inch in diameter and three inches deep, then from side No. 1
bore a hole five eigths of an inch diameter into the other; for the nut

9734X of the arbor, the arbor is five inches long inclusive of the head on the lower end, which should be large enough to prevent its drawing into the block with a hole through it to run a lever through, the screw commences at the Neck and runs down two inches, is a square thread, cut as deep as the neck on the upper end of the arbor— Turn up side No. 3 and lay out a boxing to give room for winding the cord round the first mentioned arbor, strike two lines parallel with the block, one a quarter of an inch, the other three inches and three quarters from side No. 4; then from the scribe first struck round the block, strike two others parallel with it, one each side, one and three fourths of an inch distant and the box is laid out, then turn up side No. 1. and establish a point on the line running across the centre of the block two inches from side No. 4 and bore a hole one inch and a quarter diameter through into the boxing below, which will be about one inch through, round the upper corner at four different points, which will steady the block and prevent its cutting the cord— The Wheel mentioned is metal three and an half inch diameter half an inch or five eighths of an inch thick with a square hole in the centre seven eighths of an inch diameter to fasten on the arbor, the arbor may be cast on the wheel in that case three fourths of an inch in diameter will do, the arbor on the tooth wheel passes through the block, and a pin put through it to keep it in its proper place, it must have two holes through it at right angles about the centre of the box, large enough to let the cords pass through.

What I claim as my own Invention and not previously known in the above described Bedstead, is first, the manner of framing the rails into the posts, Secondly, the method of putting in the head and foot boards— Thirdly, the mode of attaching the sacking to the rails and the general arrangement of the sacking— Fourthly the blocks with pullies used in cording, as described in the Specification and Fifthly the Jack used to strain the cords and sacking with.

Wm. W. [illegible] — Christian Knisely
R. L. Fuller

[illegible]

2268 [illegible] — [illegible]